Patented Jan. 11, 1927.

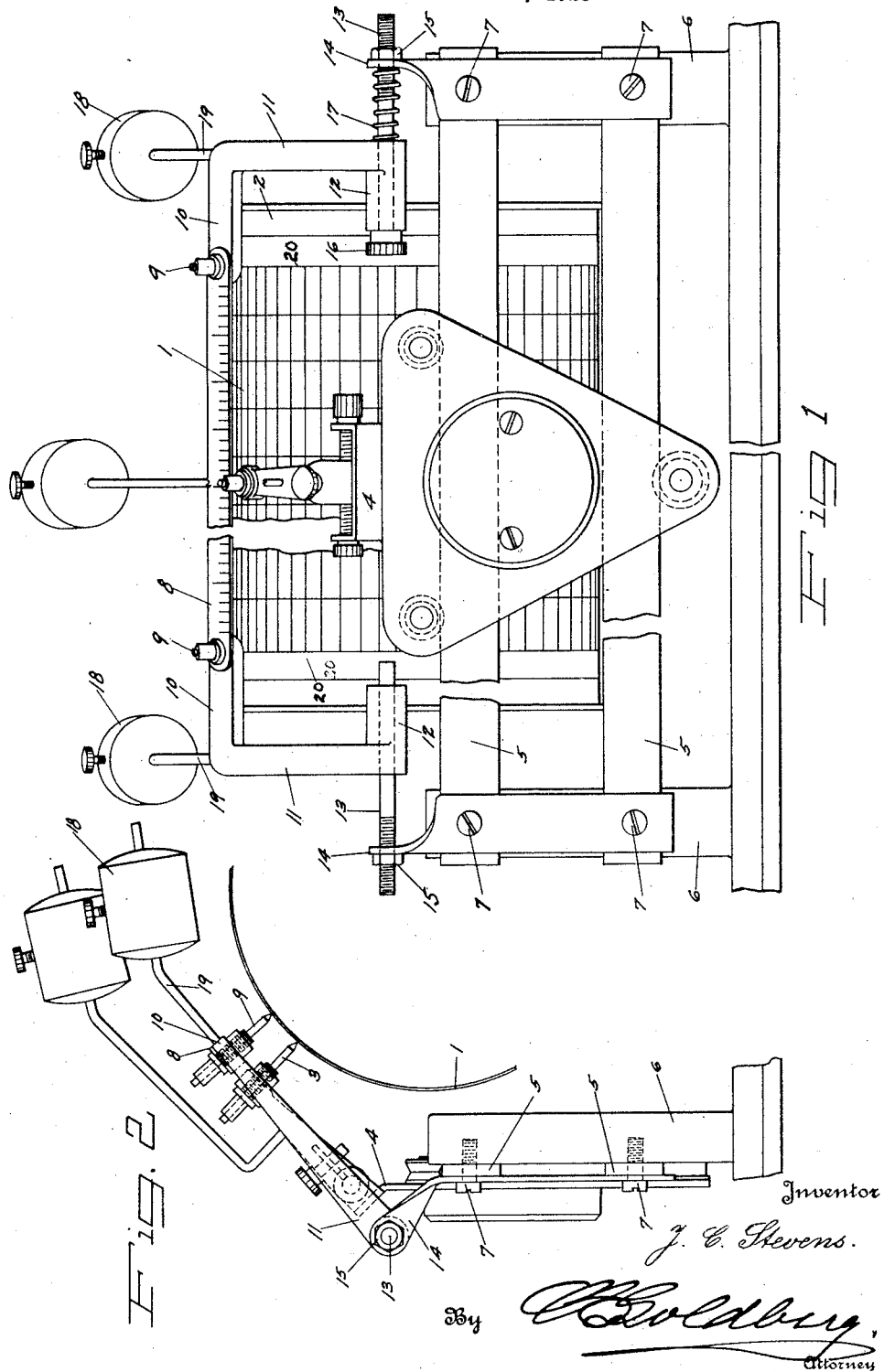

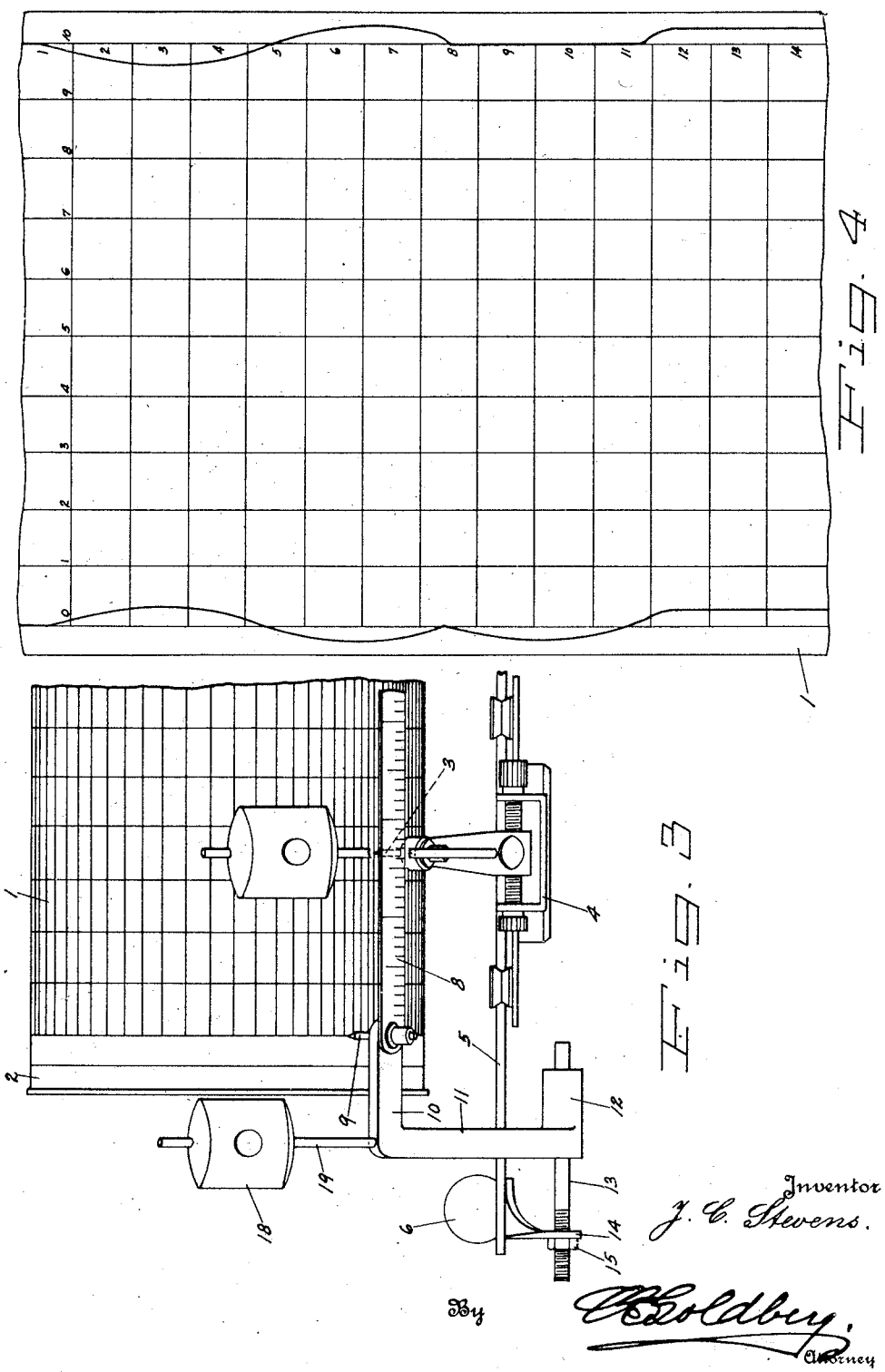

1,614,264

UNITED STATES PATENT OFFICE.

JOHN C. STEVENS, OF PORTLAND, OREGON, ASSIGNOR TO LEUPOLD, VOLPEL & CO., OF PORTLAND, OREGON, A CORPORATION OF OREGON.

DOUBLE-BASE-LINE ATTACHMENT FOR WATER-LEVEL RECORDERS.

Application filed August 17, 1925. Serial No. 50,867.

My invention relates to double base line attachments for water level recorders in which two base line pencils at a fixed distance from each other press against the recording paper.

The objects of my invention are to produce a novel device by means of which errors in the record, due to expansion, contraction, or uneven travel of the recording paper, can be instantly recognized, and therefore corrected.

Another object is to produce a device which is simple in construction, and can easily be attached to a water level recorder without change of construction of the latter, and is therefore available for those water level recorders which are already in use.

Other objects and advantages are to be found in the construction and arrangement of parts, as will be described in the specification, and particularly pointed out in the appended claims.

I attain these objects with the mechanism illustrated in the accompanying drawings, in which—

Fig. 1. is a front elevation of my device as attached to a water level recorder. Since the two end portions are sufficient to illustrate the essential details, the middle portion has been broken away.

Fig. 2 is an elevation of the right hand side of Fig. 1.

Fig. 3 is a plan view of the left hand side of Fig. 1, including the recording pencil.

Fig. 4 is a strip of the recording paper illustrating in condensed and therefore exaggerated form the variations in the base lines as traced by the base line pencils.

Similar numerals refer to similar parts throughout the several views.

Water level recorders appertain to the prior art and, beyond the enumeration of the pertinent structural details, require but little explanation.

A strip of cross sectioned recording paper 1 travels over the drum 2. The function of the drum is to time the travel of the paper and also to furnish a solid support for the point of the recording pencil 3 which is in a suitable manner attached to the recording carriage 4. The latter is mounted on the rails 5 and these again are affixed to the pillars 6 by means of the screws 7. The recording pencil 3 moves in accordance with a water level, and the line traced by said pencil 3 on the recording paper 1 furnishes a permanent record of the height of the water level during the time of operation.

Although inventive genius and precision in construction have so far produced an instrument which ordinarily works with a high degree of accuracy, errors would occasionally occur to mar the record. It is true that these errors very rarely exceeded two per cent of the actual water level height, but errors are undesirable at any time, and there are occasions when absolute accuracy is important.

After considerable investigation and experimentation it was discovered that the strip of recording paper 1 would, due to inherent stresses in the paper itself, deviate from a true linear course, also that changes in humidity would cause the paper to become sometimes wider and sometimes narrower, without any indication in the completed record when changes or deviations occurred and how extensive they were. To remedy this defect has been my problem, and the solution of it has been accomplished in the following manner: A graduated metal scale 8 is placed across the recording paper 1 slightly ahead of the recording pencil 3 yet near enough that the point of the recording pencil 3 when swung against the paper 1 will pass closely to the edge of the scale 8 and thereby enable the operator to set the recording pencil 3 accurately according to the height of the water level. The length of said metal scale 8 is equal to the width of the record as defined by the respective marginal cross section lines, usually ten inches. At each end of the metal scale 8 is a base line pencil 9 pressing against the recording paper 1. Each end of the metal scale 8 with its base line pencil 9 is firmly attached to an angle arm whose one limb 10 proceeds for a short distance in alinement with the metal scale 8, while the other limb 11 bends down toward the pillar 6 and carries a wide bearing 12 which latter is pivotally mounted on a bolt 13. Each of these bolts is screwably mounted in a bracket 14 and firmly held therein by a lock nut 15. The brackets 14 are then secured to the pillars 6 by means of the same screws 7 which ordinarily hold the rails 5 in place. One of the bolts 13, in this case the one on the right hand side of Fig. 1, is also provided with a head 16 and a helical spring 17, which latter tends to keep the bearing 12 pressed closely against the head 16. A weight 18, secured in a suitable manner, as for instance by the rod 19, to each angle arm, presses the base line pencil against the recording paper and completes the number of structural elements in my invention.

In operation, after the recording paper 1 has been placed on the drum 2, the metal scale 8 with the base line pencil 9 are first swung against the recording paper 1 and then preferably adjusted so that the pencil points will cover their respective cross section lines. This adjustment is accomplished by screwing the headed bolt 13 in or out of the bracket 14; thereupon the recording pencil 3 may be placed in position according to the height of the water level and using the graduated metal scale 8 as a measure. Under normal humidity condition the width of the space on the recording paper 1, occupied by the cross section lines, is exactly ten inches, the line traced by the recording pencil 3 corresponds with the height of the water level, no corrections need to be made, and future reading of the record is much simplified. When, through expansion or shrinkage of the paper 1, the base line pencil points can not be brought in agreement with both of the cross section lines, it is best to put the pencil point on one line at least, but, though even both cross section lines should be off the base line pencil points, the true height of the water level can still be established by measuring the position of the record line in relation to the two base lines 20.

How the base lines 20 may aid the hydrographer in ascertaining the true water level can now be explained by means of Fig. 4. For this purpose it will be assumed that the numerals from one to ten at the top of the recording paper 1 represent the height of the water level in feet, and the numerals from one to fourteen at the right side, the hours during which the record was taken. At the beginning of the first hour the base line pencil 9 coincided each with its particular cross section line and any line traced by the recording pencil 3 corresponds with the true water level.

From the first to the fifth hour, however, the paper expanded evenly from the middle of the paper toward both sides (even though it seems as if the graduated metal scale had contracted instead) and if the recording pencil 3 happened to indicate the five feet water level, that would also be the true level, but all the closer the water level should approach the zero or the ten feet stage, all the more the apparent reading would differ from the true water level and a correction should be made in the same ratio as the respective base line deviates from its cross section line. That means, above the five feet stage the water level would be lower than the record indicates, and below the five feet stage higher.

From the fifth to the eighth hour a contraction of the paper took place and, where necessary, corrections as outlined in the above paragraph would have to be applied. In this case the apparent level above the neutral axis represented by the five feet stage would be deficient, and below the neutral axis excessive.

From the eighth to the eleventh hour one sided contraction of the paper occurred. Errors at the ten feet stage are nil, but become greater in the same ratio as the zero level is approached.

From the eleventh to the fourteenth hour the paper shifted without changing in width. Errors at all stages are equal to the deviations of either one of the base lines from its cross section line.

In this manner errors per se, as well as their magnitude, are instantly discernible, and corrections can be applied where necessary.

Having thus described my invention, it will be seen that my objects have been accomplished and, though I have shown the preferred form of construction, I reserve to myself the right to make minor changes, providing I do not contravene the spirit and principle of my invention.

I claim:

1. A water level recorder having a strip of recording paper, and a recording pencil traveling across the width of the recording paper, with two base line pencils, one at each longitudinal edge of the recording paper, said base line pencils being rigidly connected at a predetermined distance from each other and marking the boundary of travel for the recording pencil toward the respective edge of the recording paper.

2. A water level recorder including a strip of recording paper having longitudinal cross section lines, with two base line pencils, one at each longitudinal margin of the recording paper, said base line pencils being rigidly connected at a predetermined distance from each other, and means to adjust the two base line pencils whereby at least one of said base line pencils will correspond with its respective marginal cross section line.

3. A water level recorder including a strip of recording paper having longitudinal cross section lines from margin to margin, with a graduated scale, and a base line pencil rigidly attached at each end of the graduated scale, the distance between said base line pencils corresponding to the normal distance between the marginal cross section lines.

4. A water level recorder including a recording pencil and a strip of recording paper, with means swingingly attached to the water level recorder to mark a continuous line on each side of the recording pencil, said means including a graduated scale, base line pencils, and weights pressing the base line pencils against the recording paper.

5. A water level recorder including a recording pencil supported on pillars and movable therebetween, with a base line pencil on each side of the recording pencil, a graduated scale holding the base line pencil rigidly at a predetermined distance, a bracket removably attached to each pillar, a pivotal bolt mounted in each bracket, and an angle arm swingingly mounted on said pivotal bolt and extending from said pivotal bolt to the adjacent end of the graduated scale.

6. A water level recorder including a recording pencil mounted on two pillars and movable therebetween, with a base line pencil on each side of the recording pencil, a graduated scale connecting said base line pencils rigidly with each other, a bracket attached to each pillar, a pivotal bolt screwably mounted in each bracket, an angle arm swingingly mounted on each pivotal bolt, said angle arm extending to the adjacent end of the graduated scale, and a helical spring around one of said pivotal bolts between the angle arm and the bracket.

7. A water level recorder including a movable recording pencil, with two base line pencils, one on each side of the recording pencil, and a graduated scale rigidly connecting the two base line pencils, whereby the exact placing of the recording pencil relative to the base line pencils can be determined.

Signed by me at Portland, Oregon, this 3rd day of July, 1925.

J. C. STEVENS.